G. H. COOK.
LOCK NUT.
APPLICATION FILED OCT. 3, 1916.

1,249,336. Patented Dec. 11, 1917.

WITNESSES
William C. Cook
John T. Dwight

INVENTOR
Geo. H. Cook.
BY
Herbert Cottrell
ATTORNEY

UNITED STATES PATENT OFFICE.

GEORGE H. COOK, OF BELLEVILLE, NEW JERSEY.

LOCK-NUT.

1,249,336.  Specification of Letters Patent.  Patented Dec. 11, 1917.

Application filed October 3, 1916. Serial No. 123,461.

*To all whom it may concern:*

Be it known that I, GEORGE H. COOK, a citizen of the United States, residing at Belleville, in the county of Essex and State of New Jersey, have invented certain new and useful Improvements in Lock-Nuts, of which the following is a specification.

My invention relates to a lock nut adapted to be operated upon any correspondingly threaded bolt, and has for an object to provide means for positively holding the nut from being unscrewed by shock or use, the said means being movably mounted within the body of the nut and being adapted to automatically engage with a ratchet faced washer to hold the nut in an operative position, also means whereby it may be readily released to an inoperative position for adjustment or removal, the said washer being provided with means to hold it in a fixed position.

Figure 1:
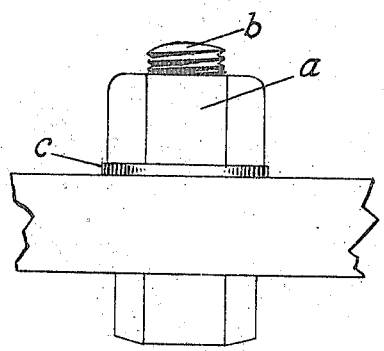
Figure 2:
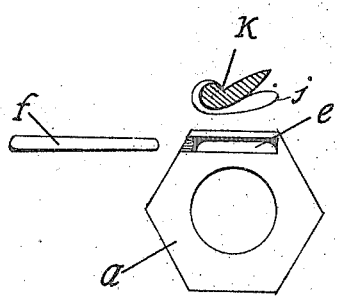
Figure 3:
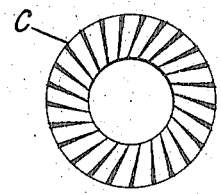
Figure 4:
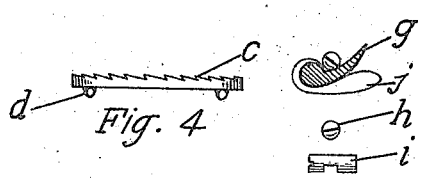
Figure 5:
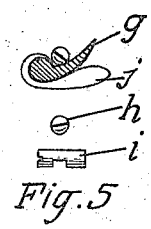
Figure 6:
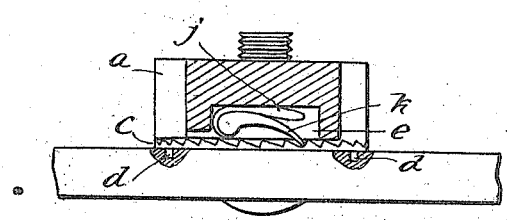

In the accompanying drawings, forming part of this specification, and in which like letters of reference designate corresponding parts in the several views:

Figure 1 is a side view of the lock nut, Fig. 2 is a bottom view of the lock nut with pawl and spring detached, Fig. 3 is a face view of the ratcheted washer, Fig. 4 is an edgewise view of same disclosing bottom projections which serve to hold the washer from turning, Fig. 5 is an alternative form of pawl and spring, with rotative cam to engage or release it. Fig. 6 is a longitudinal sectional view taken through the nut lock assembled, the section being taken through the mortise in the nut. My improved lock nut $a$ comprises a bolt $b$ correspondingly threaded, and a ratchet faced washer $c$ thereon having projections $d$ upon the face opposite the ratchet to hold it in a fixed position.

The nut $a$ has a mortise recess $e$ in the body thereof adapted to receive the spring $j$ and pawl $k$, the mortise has a shallow extension at one end to admit of the use of drift $f$ to press under pawl $k$ to release pawl from ratchet so that nut $a$ may be unscrewed, an alternative form of pawl and spring may be used if preferred in which the pawl $g$ is more curved to afford use of cam $h, i$, which may be rotated to put the pawl $g$ into operation, or reversely to release the same from ratchet.

Having thus described my invention, what I claim is:

1. In a nut lock, the combination with a bolt, of a nut threaded on the bolt, a locking washer engaging over the bolt beneath the nut and having ratchet teeth in one face and anchoring projections in its opposite face, said nut having a mortise in one end and near one side facing the teeth of the washer, an elongated pawl having a washer engaging end, and an elongated spring bearing against the inner side of the pawl and diverging from the washer engaging end of the pawl, said spring and pawl being adapted to be loosely seated in the mortise with the spring innermost and adapted to urge the wash engaging end of the pawl into contact with said teeth of the washer.

2. In a nut lock, the combination with a bolt, of a nut threaded on the bolt, a locking washer engaging over the bolt beneath the nut and having ratchet teeth in one face opposite the nut and anchoring projections on its other face, said nut having a mortise in one end near one side, the mortise being relatively shallow at one end and opening thereat through the side of the nut, an elongated pawl having a washer engaging end, and an elongated spring bearing against the inner side of the pawl and diverging from the washer engaging end of the pawl, said pawl and spring being adapted to be seated in the mortise with the washer engaging end of the pawl remote from the shallow end of the recess and with the spring normally urging the washer engaging end of the pawl through the recess into contact with the ratchet teeth of said washer, the shallow end of the recess being adapted to receive an instrument therethrough for contact with the outer side of the pawl to retract the latter from the washer.

In testimony whereof I affix my name in the presence of two subscribing witnesses.

GEO. H. COOK.

Witnesses:
WILLIAM C. COOK,
JOHN T. WRIGHT.